United States Patent [19]
Dance et al.
[11] 4,300,054
[45] Nov. 10, 1981

[54] DIRECTIONALLY POSITIONABLE NEUTRON BEAM

[75] Inventors: William E. Dance, Dallas; Harry M. Bumgardner, Jr., Arlington, both of Tex.

[73] Assignee: Vought Corporation, Dallas, Tex.

[21] Appl. No.: 118,150

[22] Filed: Feb. 4, 1980

[51] Int. Cl.[3] .................... G02B 5/00

[52] U.S. Cl. .................... 376/190; 250/251

[58] Field of Search .................... 250/505, 499, 251, 514, 250/493

[56] References Cited

U.S. PATENT DOCUMENTS

| | | | |
|---|---|---|---|
| 2,714,170 | 7/1955 | Bloch | 250/499 |
| 3,128,380 | 4/1964 | Nirschl | 250/505 |
| 3,558,890 | 1/1971 | Yanagishital et al. | 250/505 |
| 3,914,612 | 10/1975 | Cason et al. | 250/499 |

*Primary Examiner*—Harold A. Dixon
*Attorney, Agent, or Firm*—James M. Cate; S. S. Sadacca

[57] ABSTRACT

Disclosed is apparatus for forming and directionally positioning a neutron beam. The apparatus includes an enclosed housing rotatable about a first axis with a neutron source axially positionable on the axis of rotation of the enclosed housing but rotationally fixed with respect to the housing. The rotatable housing is carried by a vertically positionable arm carried on a mobile transport. A collimator is supported by the rotatable housing and projects into the housing to orientationally position its inlet window at an adjustably fixed axial and radial spacing from the neutron source so that rotation of the enclosed housing causes the inlet window to rotate about a circle which is a fixed axial distance from the neutron source and has the axis of rotation of the housing as its center.

13 Claims, 3 Drawing Figures

DIRECTIONALLY POSITIONABLE NEUTRON BEAM

DESCRIPTION

1. Technical Field

This invention relates to neutron radiography. More particularly, it relates to a directable and orientationally positionable neutron beam source carried on a mobile vehicle.

Because thermal neutrons are absorbed, scattered and attenuated by hydrogen protons but readily pass relatively unattenuated through many metals, neutron radiography has developed as a valuable non-destructive testing technique. For example, a properly controlled neutron beam may be directed through two metal parts secured together by an organic adhesive, such as epoxy or the like, and directed onto a suitable photographic film or plate to produce an image characteristic of the density of the adhesive. Accordingly, voids in the adhesive between the metal parts may be readily identified. Such non-destructive testing techniques are quite valuable since neutron radiography may be used to examine otherwise hidden flaws in bonded structures such as those widely used in the aircraft industry. Not only is such non-destructive examination useful in production of bonded structures, the same techniques are useful to locate voids or other damage to such parts which occurs in use through corrosion, excessive stress, etc.

2. Background Art

Neutron radiography apparatus has heretofore been limited to use in fixed locations which a neutron source is contained in a moderator or shielding material and a beam of neutrons extracted therefrom by a collimator extending into or through the moderator or shielding material.

Widespread use of neutron radiography, however, has been somewhat limited because of the nature of suitable neutron sources. Use of isotopes which emit suitable neutrons, such as californium ($Cf^{252}$), requires massive shielding, thus limiting their use as a mobile sources. Furthermore such isotopes constantly emit neutrons, whether or not in use, and therefore present a constant danger to personnel. The neutron flux from such sources is also relatively low for radiography purposes and is constantly decaying, thus exposure times must be increased and neutron flux density must be re-calculated as the source decays. For these reasons and others, radioactive isotopes are generally impractical for use as mobile neutron radiography sources.

Various neutron generators have been developed for other uses. For example, high energy (fast) neutrons may be generated by directing an ion beam in a sealed accelerator tube at a suitable target which then emits high energy neutrons. Such generators are typically used as analytical tools wherein the test material is irradiated with high energy neutrons and the composition of the test material determined by analyzing the emissions therefrom. Such high energy neutrons are not particularly suitable for radiography, however. Instead, for neutron radiography purposes the energy of high energy (fast) neutrons must be reduced to lower energy (thermal) neutrons by a suitable moderator and then directed to the article under examination. Unfortunately, since the thermalized neutrons are non-directional, a directional thermal neutron beam may be produced only by slowing down essentially all the fast neutrons in a moderating medium surrounding the target and extracting a collimated beam by inserting an appropriate collimator into the moderator with the inlet window of the collimator in the vicinity of the fast neutron source. It will be apparent, therefore, that such moderated sources are not readily adaptable to mobile applications, particularly where orientational maneuverability of the beam is essential. Furthermore, since the thermal neutron flux in a moderator medium surrounding an accelerator target is not spatially homogenous, the spatial relationship of the inlet window of the collimator and the target must ordinarily remain fixed. Accordingly, orientational positioning of a neutron beam was not heretofore possible without moving the entire assembly including the neutron source, the moderator and the collimator as a single unit.

High energy neutron generators conventionally take the form of an elongated tube with a target at one end and an ion beam source at the opposite end. A high voltage source is conventionally connected to the ion beam source end of the generator tube by a plurality of heavy coaxial cables. Radical flexing or twisting of the semi-rigid high voltage supply cables at feed-through locations in the end of the accelerator tube invariably damages the input connections, however, thereby rendering it virtually impossible to maneuver and aim a collimated thermal neutron beam. Accordingly, such moderated sources have heretofore been limited to fixed locations or restricted to movement in only one plane such as across a floor or the like.

DISCLOSURE OF THE INVENTION

In accordance with the present invention, a neutron radiography inspection head is provided which is transportable on a mobile carrier and which is adapted for directional positioning of a neutron beam. The inspection head comprises an essentially spherical housing containing a liquid moderator with a neutron source positioned in the sphere on one axis of the sphere. The sphere contains a collimator rigidly mounted on the spherical housing in a fixed orientational relationship with the neutron source and the sphere is rotatable about the axis on which neutron source is located. The neutron source remains fixed with respect to the arm or mounting means supporting the sphere but the sphere (and thus the collimator) is rotatable about the axis on which the neutron source is located so that the collimator inlet window remains orientationally fixed with respect to the source while the axis of the thermal neutron beam is positionable.

Since the housing supporting the collimator rotates about the neutron source while the neutron source remains fixed, high voltage cables supplying power to the neutron generator are not flexed when the collimator is rotationally positioned. Thus the collimator (and thus the neutron beam) may be positioned and directed as desired without twisting or flexing the high voltage cables. However, since the collimator inlet window is orientationally fixed with respect to the fast neutron source, the thermal neutron flux density of the directed beam is relatively constant regardless of the projected direction of the directed beam. By mounting the inspection head on a horizontally and/or vertically moveable arm carried on a mobile carrier transport, the inspection head may be fully mobile as well as directionally and locationally positionable, thereby permitting thermal neutron radiography of operational equipment such as aircraft, missiles, etc., in the field with the neutron beam directable to the inspection object from any desired direction. Other features and advantages of the invention will become more readily understood from the following detailed description taken in connection with the appended claims and attached drawings.

BRIEF DESCRIPTION OF THE DRAWINGS

The details of the invention will be described in connection with the accompanying drawings in which.

BEST MODE FOR CARRYING OUT THE INVENTION

Figure 1:
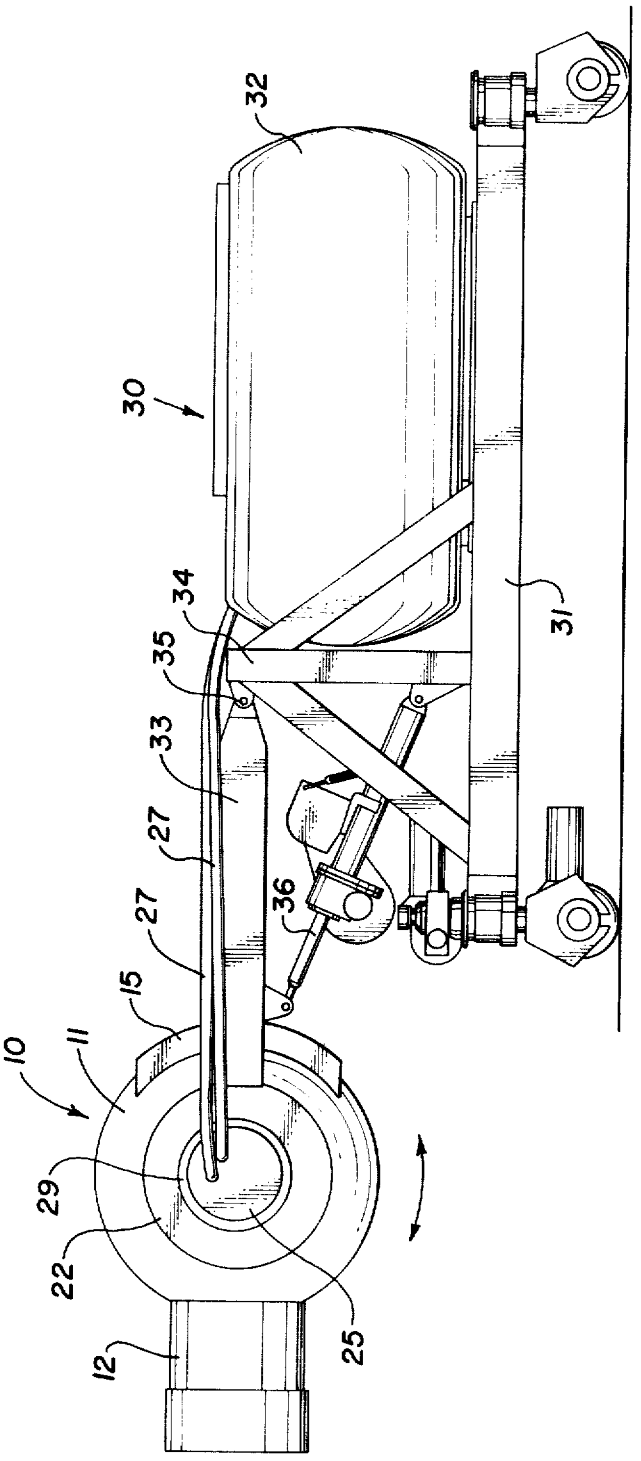
FIG. 1 is an elevational view of a mobile carrier employing the directable inspection head of the invention.
Figure 3:
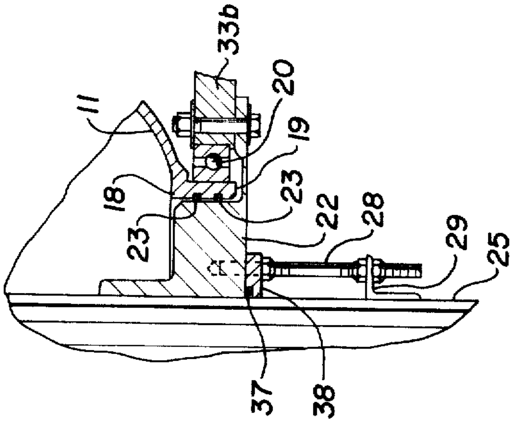
FIG. 3 is a detailed sectional view of the support bearing and seal arrangement employed in the preferred embodiment of the invention to support a neutron generator on the axis of rotation of the moderator container yet permit rotation of the neutron beam collimator thereabout.

In the preferred embodiment of the invention a substantially spherical inspection head, generally indicated at 10, is carried on a mobile carrier generally indicated at 30. It will be appreciated that the mobile carrier may take many forms. However, in the preferred embodiment illustrated, the carrier 30 comprises a wheeled frame 31 which carries a suitable high voltage source 32 and a vertically positionable carriage arm 33 for supporting the head 10. The carrier 30 may take many various forms and may even be self-propelled and/or remotely controlled. Preferably, suitable controls for the positioning arm 33, controls for the neutron generator, and means for cooling the neutron generator are also mounted on and carried by the carrier 30. In the embodiment illustrated the positionable carriage arm 33 comprises a pair of suitably braced parallel arms **33*a* and 33*b* pivotally attached at one end thereof to support framework 34 on carrier 30 by pivot pins 35. Suitable expansion and contraction means 36, such as a screw jack, hydraulic cylinder or the like, is attached between the carriage arm 33 and framework 35 so that upon expansion or contraction of the expansion and contraction means 36 the carriage arm 33 is pivoted about the pivot pin 35 to raise or lower (and this vertically position) the head 10** as desired.

Figure 2:
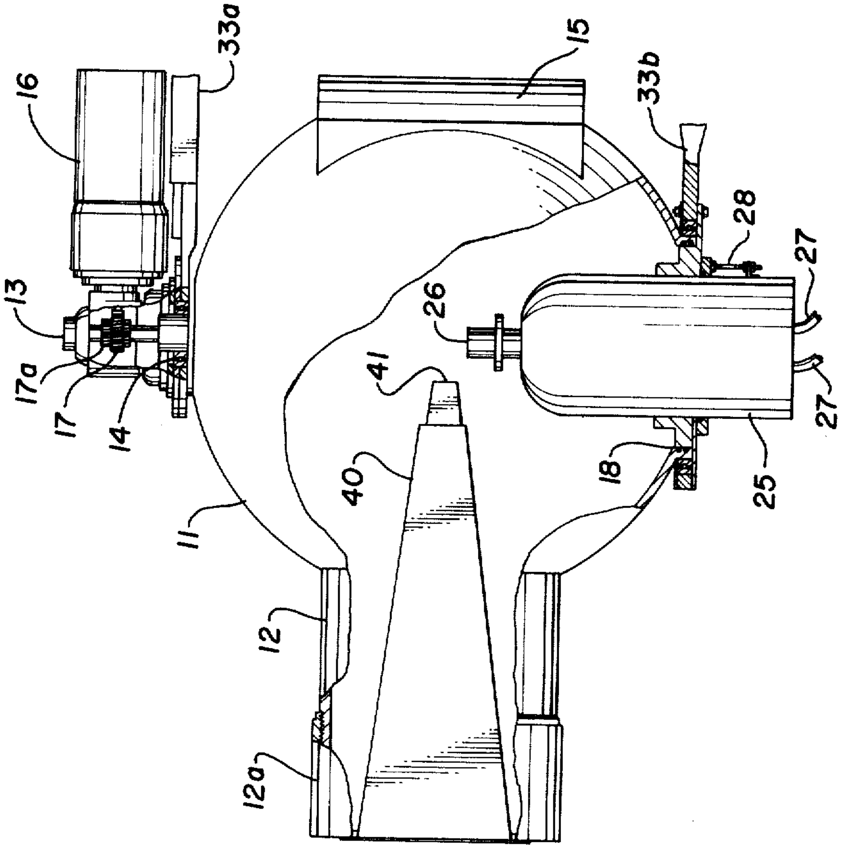
FIG. 2 is a top plan view, partially in section, of the directable head of the invention.

The rotatable head 10 is illustrated in top plan view, partially in section, in FIG. 2. In the preferred embodiment the head 10 comprises a spherical housing 11 with a beam collimator support housing 12 integrally formed therewith and projecting radially therefrom. The housing 11 is mounted for rotation about its horizontal axis by means of a horizontally extending axle 13 secured externally of the housing 11 and passing through a suitable support bearing 14 carried by the end of carriage arm **33*a*. Axle 13 carries a drive gear 17*a* coupled through worm gear 17 to drive motor 16 carried on carriage arm 33*a*. An opening 18 in housing 11 coaxially aligned with axle 13 is provided on the opposite side of the housing 11. Opening 18 is provided with an axially extending flange 19 which is supported by bearing 20 carried in the end of the opposite positionable carriage arm 33*b*. Accordingly, upon activation of drive motor 16 housing 11 is rotated about its horizontal axis on support bearings 14 and 20**. A relatively large opening, however, is provided concentric with the axis of the housing at one side thereof.

An annular flange hub 22 carried by carriage arm **33*b* is fitted within opening 18. Sealing means, such as one or more O-rings 23, are carried in annular grooves 24 in the inner face of radially extending flange 19 to provide sealing engagement between flange 19 and flange hub 22. It will thus be observed that housing 11 may be rotated about its axis with flange 19 rotating concentrically between bearing 20 and flange 22 with bearing 20 providing support therefor and the O-rings 23 providing sealing engagement between the housing 11 and the stationary flange hub 22**.

From the foregoing it will be observed that housing 11 is supported by and between parallel beams **33*a* and 33*b* and rotatable about its horizontal axis. However, flange 22 forms an annular hub which is fixed with respect to arm 33*b*. Accordingly, a neutron generator or other source mounted within the flange hub 22 will remain rotationally fixed with respect to the arm 33*b* while the housing 11** may rotate thereabout.

In the embodiment illustrated, a neutron generator comprising an elongated housing 25 is mounted within annular hub 22 with its longitudinal axis coincident with the horizontal axis of the housing 11. Although neutron generators may be of various sizes, configurations, etc., such generators generally comprise an elongated evacuated tube with a high energy ion source near one end thereof and a target at the opposite end. Illustrative of generators of this type is a sealed tube fourteen MeV neutron generator such as the Model A-711 manufactured by Kaman Sciences Corporation. This neutron generator (and the illustrated generator) comprises an enclosed cylindrical housing 25 with a target 26 at one end thereof and a plurality of high voltage inputs 27 at the opposite end thereof. Other necessary electrical and mechanical connections (not illustrated) such as conduits for controls and cooling fluid for the neutron generator are also connected to the generator by feedthroughs in the external (ion source) end of the generator tube. The internal diameter of annular hub 22 is adapted to receive the cylindrical housing 25 and the housing 25 is inserted into the annular opening a sufficient distance to position the target 26 at the desired location, preferrably slightly removed from the geometric center of the spherical housing 11 but lying along the axis of rotation. A plurality of adjustable studs 28 are secured between hub 22 and a flange 29 carried by the housing 25 to adjustably position the target 26 at the desired location and secure the generator housing 25 within the hub 22. Sealing engagement between the housing 25 and hub 22 is provided by a suitable gasket such as O-ring 37 secured by annular compressor ring 38.

As will be apparent to those skilled in the art, the high energy (fast) neutrons emitted by the target 26 are, of course, not suitable for thermal neutron radiography. Accordingly, the energy thereof must be reduced by suitable moderator means to provide lower energy (thermal) neutrons suitable for neutron radiography purposes. Moderation of the fast neutrons is accomplished by submerging the target 26 in a moderator fluid. Conventionally, water or a suitable organic fluid such as high purity oil is utilized for the moderator fluid. Accordingly, in accordance with the invention the housing 11 is filled with a suitable moderator fluid. High energy neutrons emitted by target 26 collide with hydrogen protons in the moderator fluid giving up energy to the moderator fluid as they diffuse therethrough. Therefore, the radius of the spherical housing 11 is determined by the energy of the fast neutrons emitted and the moderator fluid utilized so that neutrons emitted from the target 26 will be effectively moderated or thermalized by multiple collisions by the time they diffuse to the containing sphere 11. To extract a beam of thermal neutrons from the moderated source, a collimator 40 is utilized.

In accordance with the invention the collimator 40 comprises a hollow shielded tube. The internal dimensions of the collimator 40 may be divergent from a relatively small inlet window end to a relatively large outlet end as required to produce the beam size desired. Collimators such as collimator 40 are well known to those skilled in the art and may take various forms. The inlet end of the collimator 40 is enclosed by a suitable window 41 and the outlet end covered by a suitable dust cover 42 or the like. The purpose of window 41 is, of course, the keep the moderator fluid out of the collimator 40 while permitting thermal neutrons to pass therethrough relatively unattenuated. Accordingly, the window 41 may be any suitable material such as aluminum, for example.

Since the target 26 is usually a flat plate and lies in a plane normal to the longitudinal axis of the generator cylinder 25, the thermal neutron flux at any point location within the sphere 11 will vary with respect to the distance of the point from the target and the spatial orientation of the point with respect to the plane of the major face of the target 26. Accordingly, the window 41 must remain spatially positioned with respect to the target 26 to receive a constant thermal neutron flux. If the spatial orientation of the window with respect to the target is varied, the neutron flux received is varied. However, since the center of the target 26 lies on the axis of rotation of the housing 11 and the target is arranged with its major face in a plane perpendicular to the axis of the cylinder 25, the thermal neutron flux at any point along a circle of constant radius having its center on the axis of the housing 25 will be substantially constant. Accordingly, it will be observed that with window 41 radially removed from the target 26 by a fixed distance and with the collimator 40 rotatable about the longitudinal axis of the neutron generator 25, the window 41 of the collimator 40 moves in a circle of fixed radius about the axis of the sphere (and the axis of the neutron generator 25) at a fixed axial and radial distance from the target 26 and in a plane parallel with the plane of the major face of the target. Thus, the thermal neutron flux available at the window 41 remains relatively constant regardless of the rotational position of the collimator 40.

In the embodiment illustrated in FIG. 2, the axis of the collimator 40 lies in a plane normal to the axis of the generator 25. However, it will be realized that the axis of the collimator 40 need not be 90° from the axis of the genrator 25. The axis of the collimator 40 may be anywhere from between 0° and 90° from the axis of the generator so long as window 41 remains at a fixed axial distance from the target 26 and rotates about the axis of the generator 25 in a circle having the longitudinal axis of generator 25 as its center.

Referring again to FIG. 1, it will be observed that since the neutron generator 25 is fixed with respect to carriage arm 33, rotation of the housing 11 results in directing the neutron beam in any desired direction in the vertical plane without any movement of the neutron generator 25. Accordingly, the high voltage cables 27 and other conduits extending from the external end of the neutron generator are not flexed in any manner during rotation of the housing 11. With the cables 27 secured to the arm 33*b*, raising or lowering the head 10 by activation of the expansion and contraction means 36 causes flexing of the cables 27. However, the point of flexing of the cables 27 is far removed from the interconnection thereof with the neutron generator 25 and the flexing may be distributed over a relatively long length of cable. Accordingly, no undue stress or strain is imparted on the input connections at the head of the neutron generator. Likewise, other connector, such as the control and cooling connections (not illustrated) may be attached to the support arm 33*b* with flexible conduits portions provided near the pivot pins 35. Therefore, all connections at the generator feedthrough end plate may be rigid connections.

Since the carrier 30 is mobile, the horizontal direction of the directed beam can be positioned as desired by suitable positioning of the carrier 30. Raising or lowering of the positionable carriage arm 33 and rotation of the housing 11 may therefore be used to aim the beam at the desired subject under investigation from any direction. As noted above, it is not necessary that the axis of the collimator 40 be arranged 90° from the axis of rotation of the housing 11. If desired, the collimator may be positioned at any angle between 90° and 0° and accomplish substantially the same results. Furthermore, positionable carriage arm 33 may also be made rotational about its longitudinal (roll) axis. In such case, the maneuverability and positionability of the beam direction may be further increased. If the carriage arm 33 is adapted for rotation by its roll axis at a point substantially removed from the housing 11, any twisting of the cables 27 and other conduits will likewise be removed a substantial distance from the neutron generator and such twisting can be accommodated without damage to the cables or feed-through connectors by providing additional slack in the cables 27 and flexible portions in the other conduits at a point substantially removed from the generator. Likewise, it is not necessary that the axis of rotation of the sphere 11 be the horizontal axis. Similar results may be achieved where the axis of rotation is deviated from the horizontal so long as the neutron generator is supported by the support beams 33 and fixed with respect thereto while the collimator rotates about the longitudinal axis of the generator.

It will be appreciated that the invention is not limited to the use of any specific fast neutron source. Instead, the dimensions of the housing 11 may be varied as desired to accommodate various neutron generator sources which produce neutrons of various energy and flux. Likewise, the housing 11 need not be spherical but may be of any desirable and conveniently useable shape.

The collimator housing 12 may, of course, be adjustable in length to accommodate adjustable positioning of the window 41 with respect to the axis of rotation. Therefore, the neutron flux received at the window 41 may be adjustably varied as desired.

In the embodiment illustrated, the housing 11 is essentially spherical with the beam collimator housing 12 projecting therefrom. Accordingly, a counterweight 15 is provided on the side of the housing opposite the beam collimator housing 12 balancing the load on the support bearings to insure load uniformity on the gear mechanism and minimize the power required to operate the rotating drive motor 16.

Since the purpose of the moderator fluid contained within the housing 11 is to thermalize neutron radiation, the size and shape of the housing 11 will be determined by the neutron source and the moderator employed. Since the housing 11 is fully enclosed and the moderator fluid may expand or contract with changes in temperature, it is desirable that means be provided to assure that the housing is always filled with fluid. For this purpose a gravity-fed or pressurized overflow reservoir (not illustrated) may be carried by the carrier 30 and connected to the housing 11 by suitable conduit means passing through the fixed annular hub 22.

As noted above, studs 28 are adjustable in length and cooperate with flange 29 to position the target 26 at the desired location on the axis of rotation of the housing 11. Thus the axial spacing between the target 26 and the window 41 may be adjusted as desired. Adjustable radial spacing of the window 41 from the axis of rotation is accomplished by making collimator housing 12 adjustable in length. In the embodiment illustrated, the end of housing 12 is externally threaded and mates with an internally threaded end cap **12*a* which supports the collimator 40. Thus radial spacing of window 41 is adjustable by rotation of the end cap 12*a***.

It will be appreciated that the embodiment of the invention illustrated contemplates the use of a neutron beam generator employing a target which is substantially flat and oriented with the plane of its major face normal to the longitudinal axis of the generator. The invention, however, is not so limited. Any source which emits neutrons and provides a relatively constant neutron flux density at any point lying on a circle having the axis of rotation of the housing 11 as its center may be used. For example, the target 26 may be conical or cylindrical with the axis of the cone or cylinder lying on the axis of rotation of the housing 11. Furthermore, the neutron source may a body of an active isotope such as $Cf^{252}$ which is contained in a suitable container and symmetrically centered about the axis of rotation within a tube supported on the axis of rotation in the same manner as generator housing 25. Various other means for providing a neutron source positionable on the axis of rotation of the housing will be apparent to those skilled in the art.

While the invention has been described with particular reference to providing an orientationally positionable thermal neutron beam for thermal neutron radiography, it will be apparent that the principles of the invention are equally applicable for producing a positionable neutron beam useful for purposes other than neutron radiography. By selection of the neutron source, the moderator fluid and the design of the collimator, neutron beams of various energies and beam sizes may be produced. Furthermore, it will be readily appreciable that by providing means for controlling the temperature of the moderator, such as including cooling coils in or on the housing 11, a positionable beam of cold neutrons can be created. Accordingly, it is to be understood that although the invention has been described with particular reference to specific embodiments thereof, the forms of the invention shown and described in detail are to be taken as preferred embodiments of same, and that various changes and modifications may be resorted to without departing from the spirit and scope of the invention as defined by the appended claims.

We claim:

1. Apparatus for producing a directionally positionable neutron beam comprising:

(a) enclosed container means carried by support means and rotatable about a first axis;

(b) neutron source means supported on said first axis within said enclosed container means by said support means;

(c) moderator fluid substantially surrounding said neutron source and substantially filling said container means; and (d) collimator means supported by said enclosed container and having an inlet window positioned within said container and an outlet external to said container, said inlet window positioned to traverse at least part of a circle having said first axis as its center as said container is rotated about said first axis.

2. Apparatus as defined in claim 1 wherein said neutron source means is rotationally fixed with respect to said enclosed container.

3. Apparatus as defined in claim 2 which said neutron source is adjustably axially positionable on said first axis.

4. Apparatus as defined in claim 1 wherein said inlet window is radially adjustably positionable with respect to said first axis.

5. Apparatus as defined in claim 1 wherein said neutron source is a accelerator tube with its longitudinal axis substantially coincident with said first axis and supports a target symmetrically centered about said first axis.

6. Apparatus as defined in claim 5 wherein said target is a substantially flat plate with its major face normal to said first axis.

7. Apparatus as defined in claim 5 wherein said accelerator tube is supported by said support means and rotationally fixed with respect to said enclosed container.

8. Apparatus as defined in claim 1 wherein said support means is carried on a mobile carrier and is adapted to support said enclosed container on said first axis and selectively move said enclosed container vertically.

9. Apparatus as defined in claim 1 wherein said support means is carried on a mobile carrier and is adapted to support said enclosed container on said first axis and selectively move said enclosed container horizontally.

10. Apparatus as defined in claim 1 wherein said support means is adapted to rotate said enclosed container about a second axis normal to said first axis.

11. Apparatus as defined in claim 1 wherein the axis of said collimator is approximately from 90° from said first axis.

12. Apparatus as defined in claim 10 wherein the axis of said collimator is from 0° to 90° from said first axis.

13. In combination:

(a) a mobile carrier;

(b) an enclosed container rotatable about a first axis;

(c) vertically moveable support means carried by said mobile carrier and supporting said enclosed container on said first axis;

(d) neutron source means supported by said vertically moveable support means and positioned within said enclosed container on said first axis;

(e) moderator fluid substantially surrounding said neutron source means; and (f) collimator means supported by said enclosed container and having an inlet window positioned within said enclosed container to traverse at last part of a circle having said first axis as its center as said container is rotated about said first axis.

* * * * *